US007950684B2

(12) United States Patent
Borisoff

(10) Patent No.: US 7,950,684 B2
(45) Date of Patent: May 31, 2011

(54) WHEELCHAIR SIDE GUARDS

(76) Inventor: Jaimie Borisoff, Vancouver (CA)

( * ) Notice: Subject to any disclaimer, the term of this patent is extended or adjusted under 35 U.S.C. 154(b) by 502 days.

(21) Appl. No.: 11/977,836

(22) Filed: Oct. 25, 2007

(65) Prior Publication Data

US 2008/0111341 A1 May 15, 2008

Related U.S. Application Data

(60) Provisional application No. 60/862,824, filed on Oct. 25, 2006, provisional application No. 60/950,180, filed on Jul. 17, 2007.

(51) Int. Cl.
*B62J 27/00* (2006.01)
*B62M 1/14* (2006.01)

(52) U.S. Cl. .................. 280/304.1; 280/304.3; 280/644; 280/650; 297/35

(58) Field of Classification Search ............... 280/250.1, 280/304.3, 304.1, 644, 650, 657, 304.4; 297/39, 297/40, 35, 41, 218.3–218.5, 227, 228.13, 411.26–411.28, DIG. 4, 440.11
See application file for complete search history.

(56) References Cited

U.S. PATENT DOCUMENTS

| | | | | |
|---|---|---|---|---|
| 3,797,848 | A * | 3/1974 | Burnham | 280/644 |
| 4,251,106 | A * | 2/1981 | Gilbert | 297/18 |
| 4,367,894 | A * | 1/1983 | Manuel | 297/19 |
| 4,768,797 | A * | 9/1988 | Friedrich | 280/250.1 |
| 5,186,480 | A * | 2/1993 | Morgan et al. | 280/250.1 |
| 5,810,445 | A * | 9/1998 | Surot | 297/411.37 |
| 6,547,324 | B1 * | 4/2003 | Ammann, Jr. | 297/129 |
| 6,705,629 | B2 * | 3/2004 | Post et al. | 280/250.1 |
| 7,445,228 | B2 * | 11/2008 | Henry | 280/639 |
| 2008/0093821 | A1 * | 4/2008 | Menichini | 280/304.1 |

* cited by examiner

*Primary Examiner* — Anne Marie M Boehler
(74) *Attorney, Agent, or Firm* — Ade & Company Inc.; Ryan W. Dupuis; Kyle R. Satterthwaite

(57) ABSTRACT

Wheelchair side guards are provided with a strip and covering materials. The strip is sufficiently rigid to keep the shape and position of the side guards such that a user and their clothes are kept away from the wheelchair wheels. The side guards may also comprise a hinge near the middle that permit the wheelchair backrest to fold.

12 Claims, 8 Drawing Sheets

WHEELCHAIR SIDE GUARDS

CROSS REFERENCE TO RELATED APPLICATIONS

This application claims the benefit of U.S. Provisional Patent Application Ser. Nos. 60/862,824, filed Oct. 25, 2006, and 60/950,180, filed Jul. 17, 2007, both of which are incorporated herein by reference.

FIELD

This invention relates generally to wheelchair side guards.

BACKGROUND

Wheelchair technology has greatly improved over the last 100 plus years such that many existing wheelchairs on the market today provide a very functional mobility device for a variety of different individuals with mobility disability. Many wheelchair styles, types, or configurations exist, including but not limited to, folding wheelchairs, rigid "ultra-light-weight" wheelchairs, light weight wheelchairs, depot wheelchairs, tilt and recline wheelchairs, standing wheelchairs, power wheelchairs of various different configurations, and scooters.

Regardless of the type of wheelchair, a common feature often included with the basic wheelchair is "side guards", also known in the art as "clothing guards" and "wheel guards". Side guards serve multiple functions, only some of which are to keep clothes away from the wheels, to keep dirt and water away from the user, contributing to seating stability, and aesthetic appeal by fashionably narrowing the individual at the hips. As well, a similar embodiment could also apply to any other type of seating arrangement for both disabled and able-bodied individuals.

Also regardless of the type of wheelchair, it is advantageous for side guards to be light and elegant—thus reducing mechanical complexity, visual impact, and cost, as well as increasing functional usage and component longevity.

The current state of the art in wheelchair side guards consist of a planar rigid material fixedly attached to the wheelchair seat and/or backrest (rigid side guards). Common materials include, but are not limited to, aluminum, titanium, plastics (such as polycarbonate), and carbon fibre. An alternative common side guard consists of fabric (fabric side guards), such as nylon, that is attached to both the backrest and seat of the wheelchair. It is also possible that side guards manufactured from rigid materials are covered in fabric.

Drawbacks to current rigid side guards are weight, width, rigidity, and mechanical obtrusiveness. For instance, rigid side guards are usually attached vertically and parallel to the length of the wheelchair seat, with an uppermost height at or near the height of the rear wheels. The rigid side guards are also typically attached to the outside of the wheelchair frame. These configurations may hinder the ability to fold the wheelchair backrest (useful for transporting the wheelchair, in a car for instance). The rigid side guards also add width to the wheelchair and retract from the aesthetic slimming ability of side guards. The rigid side guards also present a possible danger to the disabled user in two ways. First, when a user transfers into the wheelchair, it is possible that the user's buttocks or hips or legs can traumatically contact the rigid side guards. This may lead to pressure sores or other wounds that can possibly lead to sickness and even death (e.g. from infection). Secondly, the rigid side guards may contact the user's hips in a chronic fashion throughout the day to day usage of the wheelchair. This may also lead to pressure sores and associated complications. Drawbacks to fabric side guards are associated with their flimsy construction. The fabric side guards may sag, thus reducing their effectiveness in keeping a barrier between the user and the wheelchair wheels. This also retracts from the aesthetic appeal of side guards. As well, fabric side guards do not provide appreciable seating stability that rigid side guards may provide.

SUMMARY

According to one aspect, there is provided a wheelchair comprising a frame; a seat attached to the frame; a backrest attached to the seat; drive wheels rotatably attached to the frame; and a pair of side guards attached to the wheelchair inboard of the drive wheels and bracketing the seat and backrest. Each side guard comprises an elongated stiffener band extending along an upper portion of the side guard, and a flexible covering attached to the band and extending towards the backrest and the seat. Additionally, the side guard can comprise a stiffener angle having a horizontal portion connected to the seat and a vertical portion connected to the band. Also, each side guard can further comprise an elongated stiffener strip connected to and extending along a lower portion of the covering.

The bands can be elastic such that after the side guards are deflected, the bands will return to an undeflected position. Additionally or separately, the bands can be malleable such that after the side guards are deflected, the bands will deform into a deflected position. This is particularly advantageous as the band can be shaped according to the needs of the user. Each band can be an elongated and curved strip mounted to the covering such that the upper portion of the side guard has a concave curvature. Such a band can be composed of a material selected from the group consisting of aluminum alloys, steel alloys, titanium alloys, magnesium alloys, thermoplastics, thermosetting plastics, and carbon fibre composites. Alternatively, the band can be a wire, cord, spoke and string and be attached to the wheelchair under tension.

The rear end of each band can be fastened to the backrest, and an opposed front end of each band can be fastened to a part of the wheelchair selected from the group consisting of the seat, the frame, and a cushion on the seat. Fasteners can be provided to connect the side guards to the wheelchair and which are adjustable in length. The bands can each comprise a front and a rear portion laterally hingedly connected by a hinge, such as a spring hinge. This allows the side guard to collapse when the wheelchair seatback is folded towards the seat.

According to another aspect, there is provided a side guard for a wheelchair having a frame, a seat attached to the frame, a backrest attached to the seat, and drive wheels rotatably attached to the frame. The side guard comprises an elongated stiffener band extending along an upper portion of the side guard and a flexible covering attached to the side guards and extending towards the backrest and the seat. The side guard is attachable to the wheelchair inboard of one of the drive wheels and at the outside edge of the seat and back rest.

According to another aspect, there is provided a side guard for a wheelchair having a frame, a seat attached to the frame, a backrest attached to the seat, and drive wheels rotatably attached to the frame. The side guard comprises an elongated band extending from the back rest to a front part of the wheelchair selected from the group consisting of the seat, the frame and the cushion. The side guard is attachable to the wheelchair inboard of one of the drive wheels and at the outside edge of the seat and back rest.

The side guards are expected to be more aesthetically pleasing than rigid side guards. The side guards should better keep the user and the user's clothes away from the wheels than do some rigid side guards known in the art. The side guards should be are light compared to conventional side guards, and thus the weight they contribute to a wheelchair is minimized.

The foregoing and other objects, features, and advantages of the invention will become more apparent from the following detailed description, which proceeds with reference to the accompanying figures.

DETAILED DESCRIPTION

Directional terms such as "left", "right", "horizontal", "vertical", "transverse" and "longitudinal" are used in this description merely to assist the reader to understand the described embodiments and are not to be construed to limit the orientation of any described method, product, apparatus or parts thereof, in operation or in connection to another object.

While the embodiments of the side guard described herein are described in conjunction with a manual, ultra-light wheelchair, similar embodiments can equally apply to virtually any type of wheelchair.

Figure 1:
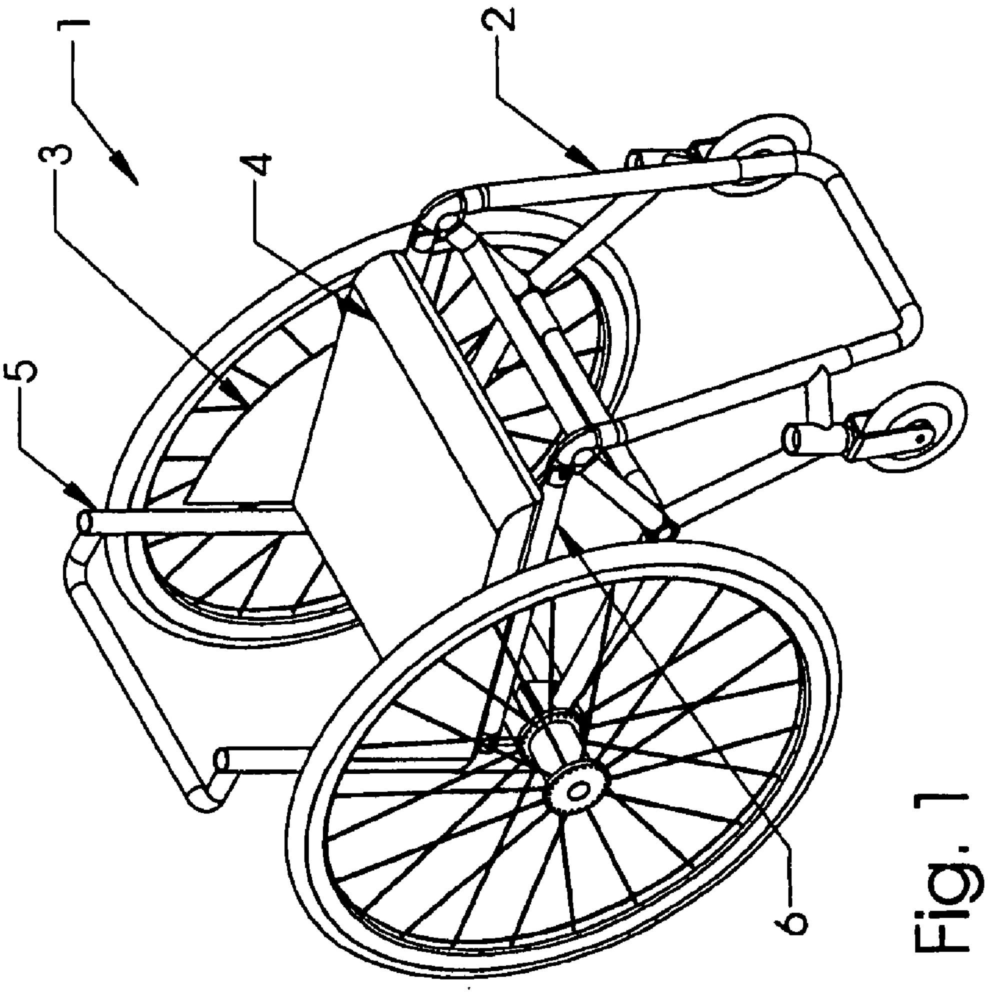
Fig. 1 PRIOR ART
FIG. 1 is a perspective view of a wheelchair with rigid side guards with portions of the wheelchair's backrest removed for ease of viewing (PRIOR ART).

Referring to FIG. 1, an example wheelchair 1 is depicted having a seat 6 attached to a wheelchair frame 2. A backrest 5 is also provided attached to the seat 6 and wheelchair frame 2. The backrest would normally be covered in upholstery or some other object (not shown) to provide stability to the user when seated. A wheelchair cushion 4 is on top of the seat 6. Side guards 3 are attached to the seat 6 on either side of the wheelchair 1 between the drive wheels (not shown) and frame 2. The side guards depicted here can be considered rigid side guards as is typically found in the art.

Figure 2:
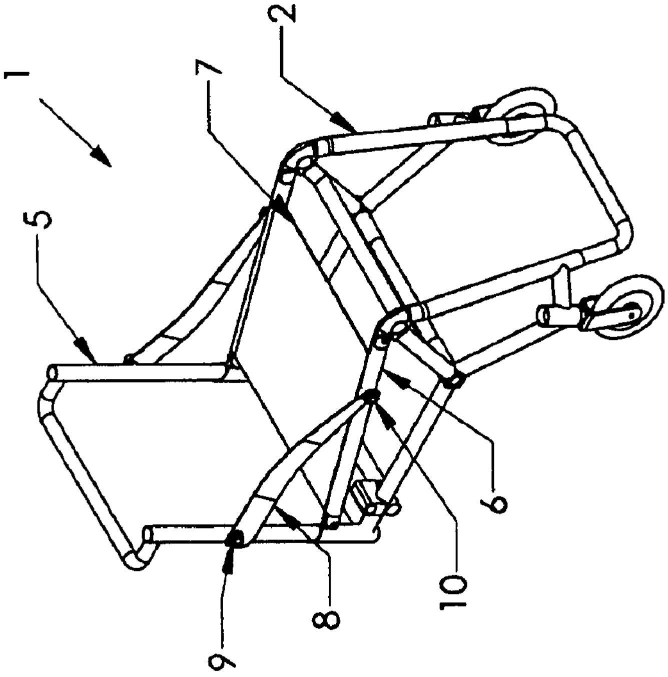
FIG. 2 is a perspective view of a wheelchair according to one embodiment with the drive wheels and portions of the wheelchair's seat and backrest removed for ease of viewing.
Figure 3:
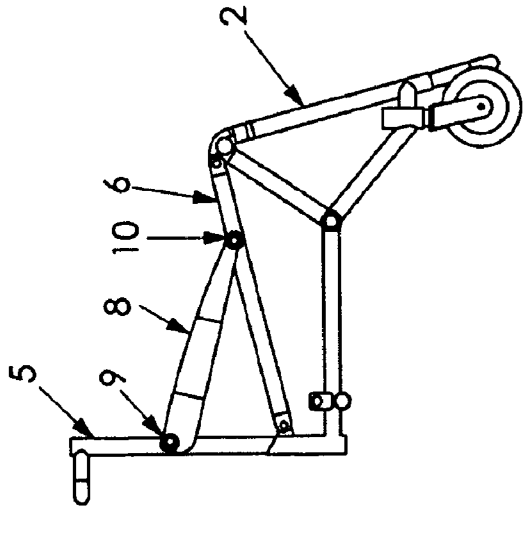
FIG. 3 is a side elevation view of the wheelchair depicted in FIG. 2.

Referring particularly to FIGS. 2 and 3 as an example wheelchair with some features not shown for ease of viewing, and according to one embodiment of the invention, a wheelchair 1 is provided having a frame 2 with attached seat 6 and backrest 5. The seat includes a sheet 7 which may be upholstery or a rigid material such as aluminum. The backrest upholstery is not shown for ease of viewing. An elongated stiffener band 8 of relatively rigid material, such as aluminum, is attached at a point 9 with a bolt to the backrest at some distance above the plane of the seat, and is also attached at a point 10 with a bolt on the seat at some distance in front of the backrest. Alternatively, the point 10 could be on the cushion 4 or frame 2, although these configurations are not shown here. The band 8 can be curved in a concave fashion as shown in FIG. 2, although a straight planar strip is also possible. It is understood that the points 9 and 10 could be comprised of alternative fastening methods such as straps, clamps (e.g. a bicycle seat post clamp—using the clamp bolt through a hole in the band 8), buckles, Velcro®, cords, buttons, rivets, glue, or any other fastener that serves to attach the strips to the wheelchair.

Figure 4:
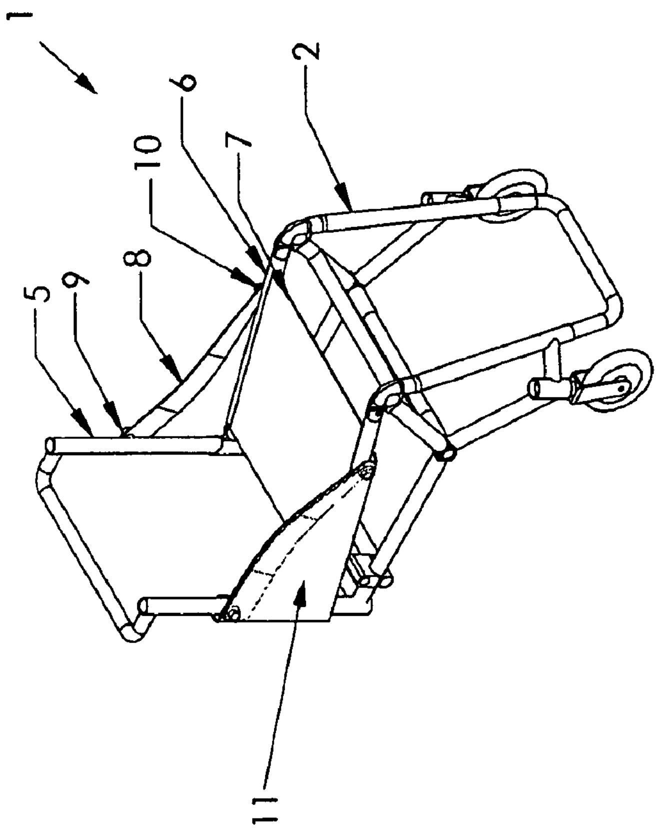
FIG. 4 is a perspective view of a wheelchair according to one embodiment.
Figure 5:
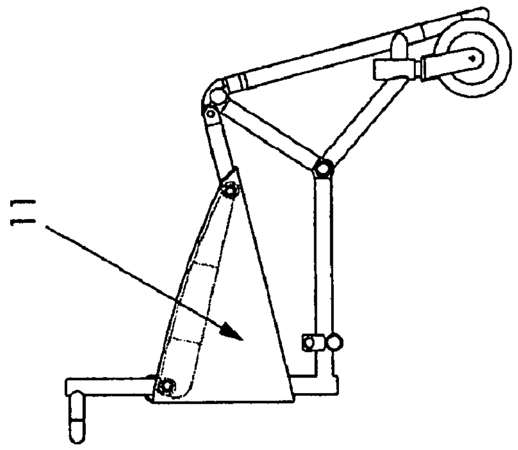
FIG. 5 is a side elevation view of the wheelchair depicted in FIG. 4.

Referring particularly to FIGS. 4 and 5, the side guard bands 8 can be covered with fabric upholstery 11, or some other flexible covering material. The fabric 11 is attached to the wheelchair 1 in a conventional fashion using grommets, straps, buckles, Velcro®, cords, buttons, rivets, glue, or any other fastener that serves to attach the fabric to the wheelchair 1. This embodiment clearly depicts a complete side guard configuration consisting of bands 8 and fabric 11. This embodiment functions similarly to the conventional rigid side guards 3 shown in FIG. 1 in that the whole of the side of wheelchair seat is covered. The advantage here however, is that the portion of the side guard below the band 8 is completely free of rigid materials, thus reducing the force capable of being transferred to a user's hips for instance, as they sit in the wheelchair for a lengthy period of time. As well, the bands 8 can be curved to provide spring-like action such that the side guards can be deflected when contacted (as often happens during transfers into the wheelchair) and then returned relatively to their original positions, although it is possible for similar flexible action even if the strips are straight instead of curved. Furthermore, the bands 8 have enough flexibility such that contacting them during transfers reduces the forces imparted by the side guards to the user's body.

Figure 6:
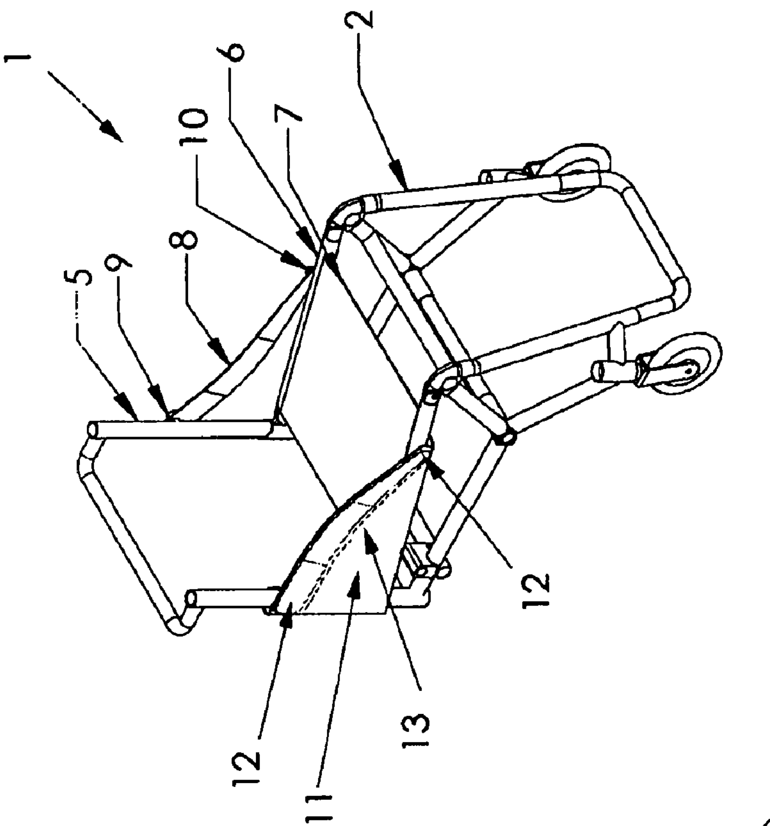
FIG. 6 is a perspective view of a wheelchair according to another embodiment.
Figure 7:
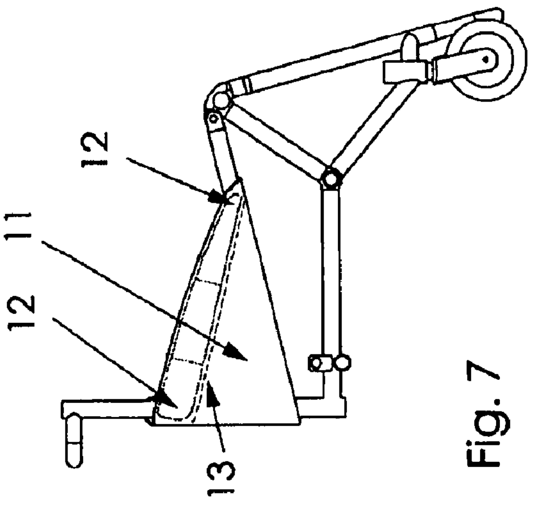
FIG. 7 is a side elevation view of the wheelchair depicted in FIG. 6.

The bands 8 could also be completely embedded in upholstery without direct fixation to the wheelchair, as is depicted in FIGS. 6 and 7. In this embodiment, the points 9 and 10 are not included, as is shown near the area 12 in the figures. Thus, the bands 8 are held in place inside the fabric by stitching 13. Alternatively, the bands 8 can be held in place using Velcro® or some other fastener method. It is also understood that a combination of the two fastening methods are possible. For instance, the band 8 could be directly attached to the backrest 5 with a bolt or clamp, and the front portion of the band 8 could "float" in the fabric covering 11, using the attachment of the fabric 11 to the wheelchair to secure the side guard in place.

Optionally, the side guards consisting of bands 8 and fabric 11 are adjustable, for instance with a strap and buckle mechanism and/or Velcro® that runs from the top of the fabric 11 to the backrest and from the front of the fabric 11 to the seat. In this configuration, the side guards can be lengthened or shortened in order to adjust the fit of the side guards to a particular user's needs and wants.

Figure 8:
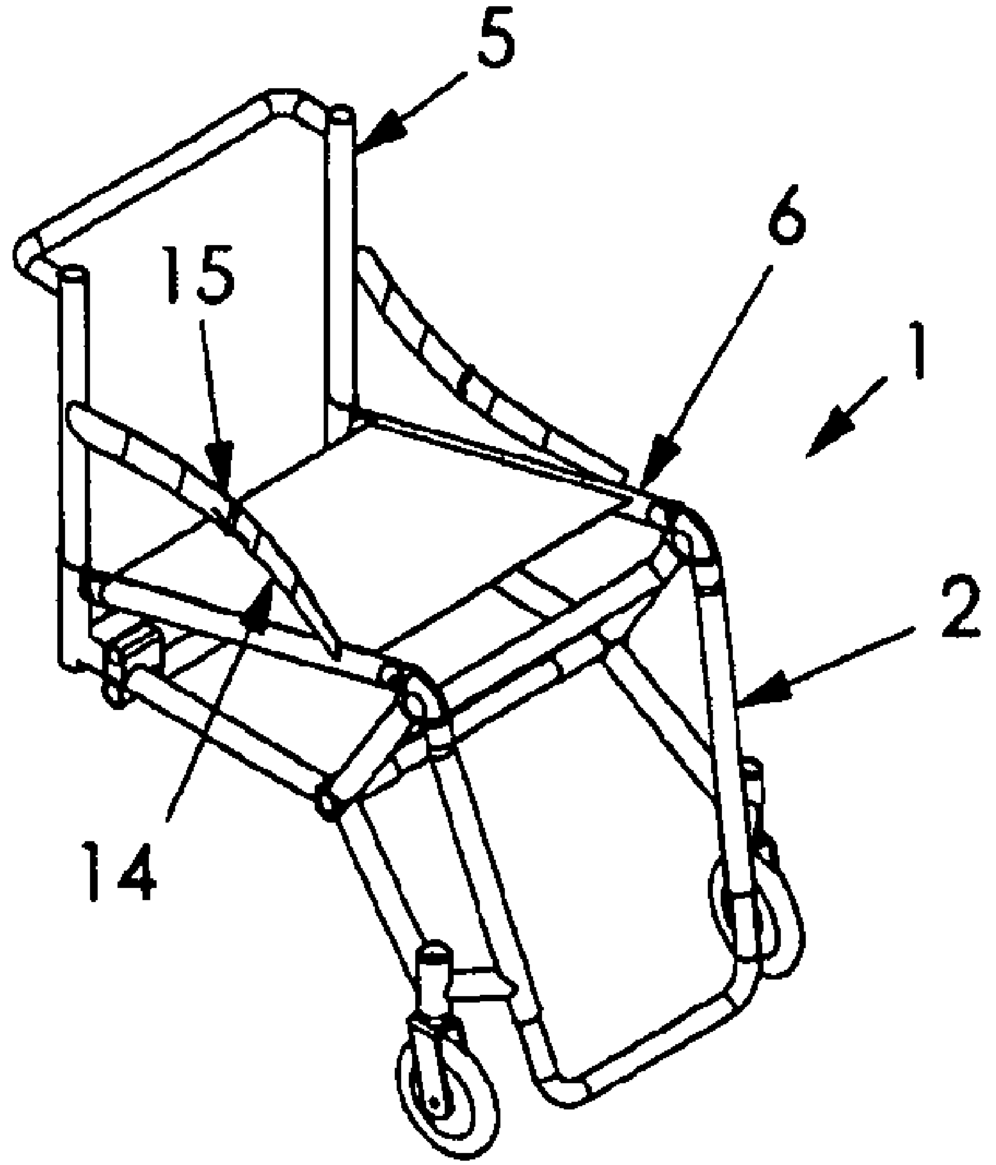
FIG. 8 is a perspective view of the wheelchair according to one embodiment that includes a hinge component.
Figure 9:
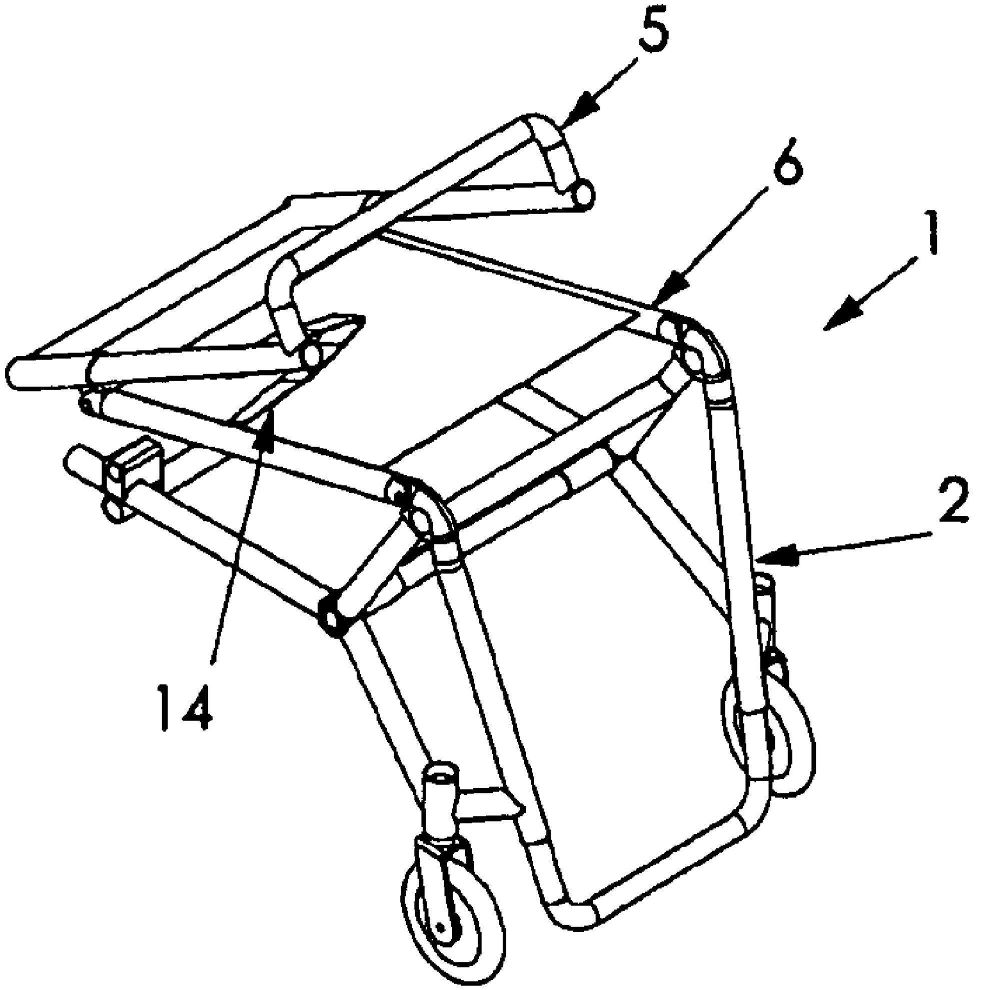
FIG. 9 is a perspective view of the wheelchair depicted in FIG. 8, with the backrest folded down.

Another embodiment, referring to FIGS. 8 and 9, incorporates the ability to fold the wheelchair backrest 5 with the side guards attached in a manner similar to the above described embodiments. In this configuration, the band 14 is constructed with a front portion and a rear portion laterally hingedly connected a hinge 15. The hinge 15 may also have a spring component included. The strip 15 is depicted in FIG. 8 with the wheelchair backrest 5 in its upright position. Note that the covering material (e.g. fabric 11 from FIG. 4) and attachment points (e.g. points 9 and 10 from FIG. 4) are not shown. FIG. 9 shows the wheelchair 1 with its backrest 5 partially folded down. The side guard band 14 is shown also folded around its hinge 15, folding into the area between the backrest 5 and seat 6. Again the covering material is not shown, although it is understood that said material is flexible enough such that the material would fold along with the strip 14 as the backrest 5 is folded down. Similarly, the attachment points (e.g. points 9 and 10 from FIG. 4, or alternatively attachment areas 12 from FIG. 6) are not shown. Again it is understood that such attachments would be sufficiently flexible to allow the band 14 to fold: for instance, flexibility could be provided with strap attachments and Velcro®, or cords, or hinges.

Figure 10:
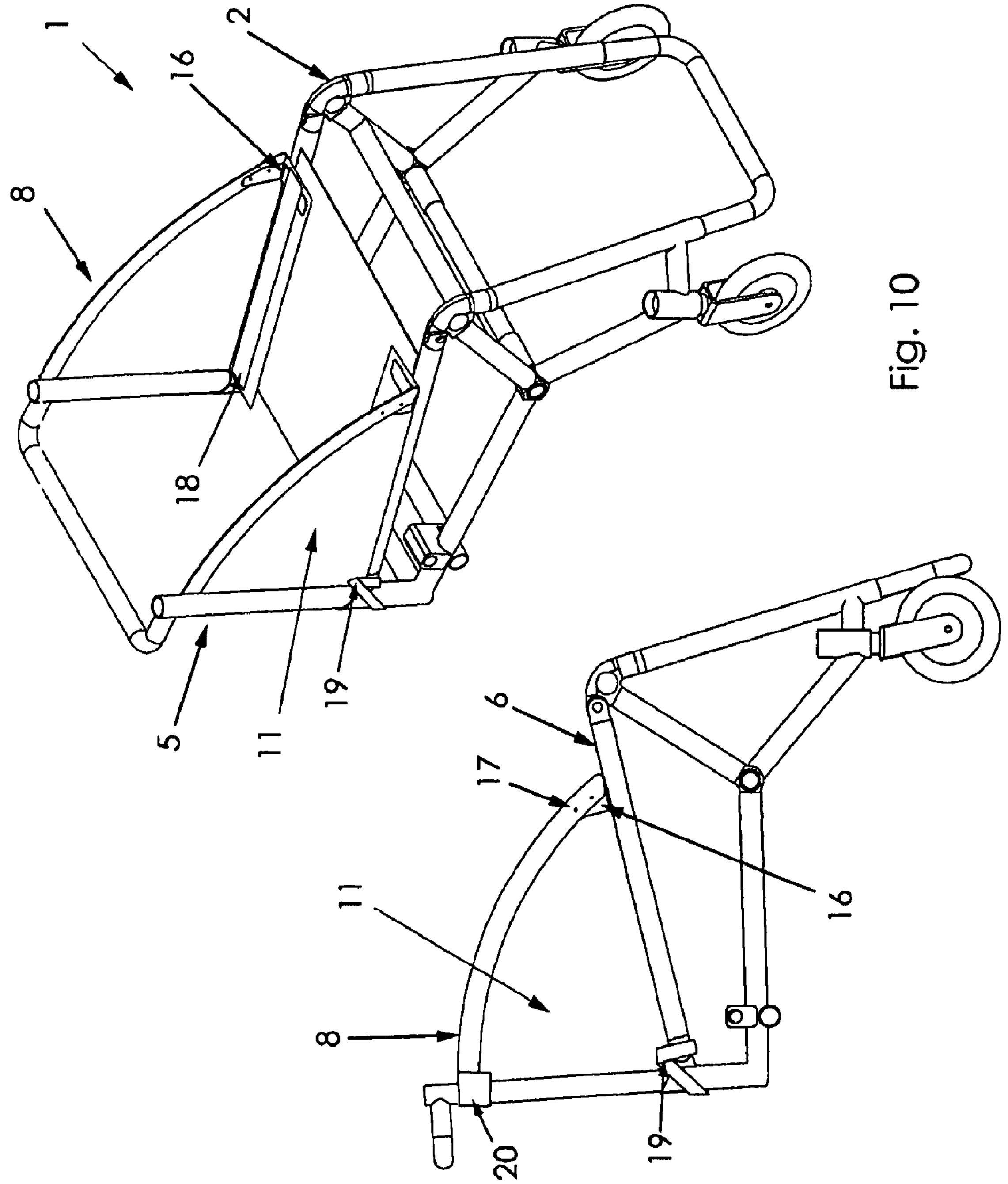
FIG. 10 is a side elevation view and perspective view of a wheelchair according to another embodiment.

Another embodiment, referring to FIG. 10, incorporates additional members attached to the wheelchair side guard in order to further stiffen the side guard. A steel stiffener angle 16 is attached to the side guard band 8 near points 17 with rivets or some other such fastener. The angle 16 is a strip bent at an angle sufficient to lay parallel to the wheelchair seat 6, lying between the wheelchair seat 6 and cushion (not shown). The angle 16 is embedded along with band 8 in the side guard fabric 11, held in place by stitching. Alternatively, the angle 16 can be attached outside the fabric by Velcro® for instance. In this embodiment (FIG. 10), the side guards are attached to the wheelchair seat 6 and cushion (not shown) by straps and Velcro®. The angle 16 is particularly useful in providing additional stiffness when the side guards are attached with straps and Velcro®, an attachment mechanism less rigid than nuts and bolts for instance. It is also understood that the metal bands 8 and angle 16 could in fact be manufactured from a single piece of material, and attached and used in the same fashion as described.

In this embodiment (FIG. 10), the side guards are attached at the bottom with a strap 19 that encircles the backrest 5 and seat 6. The top of the side guards are attached with a strap 20 that wraps around the vertical post of the backrest 5 and attaches with Velcro® to the backrest upholstery (not shown). Alternatively, the top strap 20 passes on the inside of the vertical post of the backrest 5 and attaches with Velcro® to the backrest upholstery (not shown). The fabric 11 also folds in order to sit on the wheelchair seat 6 and is attached with Velcro®.

An additional component is added to this embodiment (FIG. 10): a relatively rigid stiffener strip of aluminum 18 is attached to a portion of the side guard upholstery fabric 11 that sits on the wheelchair seat 6. The fabric 11 is attached to the wheelchair seat 6 with Velcro®, as well as being secured by straps 19 and 20. The stiffener strip 18 abuts the vertical post of the backrest 5. The stiffener strip 18 is attached to the side guard fabric 11 with Velcro®, or alternatively can be embedded inside the fabric upholstery 11. The strip 18 serves to additionally stiffen the side guards.

This stiffener angle 16 is sufficiently stiff such that the flexible side guards are kept tight to the edge of the wheelchair seat and backrest, thus further providing the ability to provide a barrier between the user and the wheels. As well, the stiffness further contributes to the ability of the side guards to provide lateral stability to the user, while still maintaining the side guard's ability to flex when needed, as during contact between the user and side guard during a transfer. The angle 16 is also malleable such that the user can adjust the angle of the angle 16 to adjust the vertical angle of the side guards with respect to the planar side of the wheelchair. As well, it is possible to make the angle 16 with a hinge at the bend (with an optional spring) to further facilitate the folding side guards described in other embodiments above.

The components of the side guards, and more specifically the bands 8 or 14, angle 16, and strip 18 can be manufactured from a light, relatively stiff but flexible, planar material to reduce the weight of the wheelchair 1, such as sheet metals such as steel alloys, aluminum alloys, titanium alloys, and magnesium alloys, or sheet thermoplastic or thermosetting plastics such as polycarbonate, or carbon fibre composites, and other materials known to those skilled in the art. In one alternative embodiment, the band 8, angle 16 and strip 18 can be formed as a single component, or the band 8 and strip 18 can be formed as a single component.

The components of the side guards, specifically the fabric 11 can be manufactured from a light fabric or other material also to reduce the weight of the wheelchair 1. Suitable such materials include nylon, rayon, polyester and other fabrics. Other materials include sail cloth, carbon composites and thin flexible plastics such as polycarbonate.

The bands 8 or 14 are depicted here as strips of aluminum with an appreciable width and thickness. It is understood that other such geometries such as wider or narrower strips and thicker or thinner materials may similarly be used. Additionally, the bands 8 or 14 may be made from wire or spring steel bands, titanium, or some other sufficiently springy material to further minimize their mechanical footprint.

Figure 11:
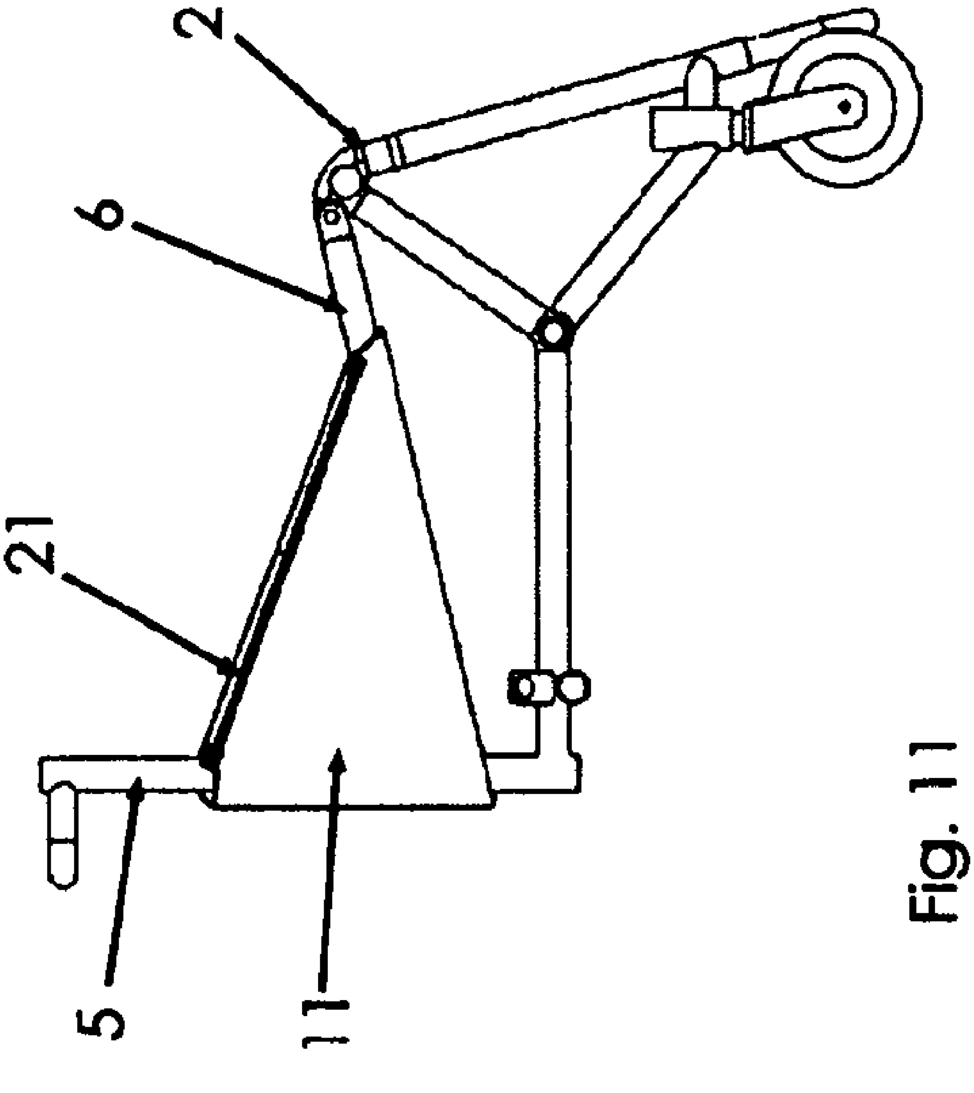
FIG. 11 is a side elevation view of a wheelchair according to another embodiment.

Another embodiment that further simplifies and provides for additional weight reductions is to use a material under tension in place of the bands 8 or 14. Such a material may be a wire, cord, spoke, string, or some other such material that may be attached under tension between two points. Thus a wire 21 (FIG. 11) is attached between the wheelchair seat 6 and backrest post 5. The wire can be attached with conventional means such as nuts and bolts, threaded nipples (as found on a bicycle wheel), welding or soldering, or other attachment means. Alternatively, the wire 21 can be attached to some other part of the wheelchair frame 2 to achieve a similar tensile member along the side of the wheelchair. Side guard fabric 11, as described above, is then draped over the wire 21 to complete the wheelchair side guard. The wire 21 can be manufactured from a variety of materials, just some of which are steel, nylon, carbon composites, titanium, etc.

While the present invention has been described herein by the foregoing embodiments, it will be understood to those skilled in the art that various changes may be made and added to the invention. The changes and alternatives are considered within the spirit and scope of the present invention.

I claim:

1. A wheelchair comprising:

a frame;

a seat attached to the frame;

a backrest attached to the seat;

drive wheels rotatably attached to the frame; and a pair of side guards attached to the wheelchair inboard of the drive wheels and bracketing the seat and backrest, each side guard comprising an elongated stiffener band extending along an upper portion of the side guard, and a flexible covering attached to the band and extending towards the backrest and the seat;

the bands each comprise a front portion and a rear portion connected by a hinge such that the bands are arranged to be folded in a lateral direction inwardly into an area between the backrest and the seat.

2. A wheelchair as claimed in claim 1 wherein the bands are elastic such that after the side guards are deflected, the bands will return to an undeflected position.

3. A wheelchair as claimed in claim 2 wherein the bands are malleable such that after the side guards are deflected, the bands will deform into a deflected position.

4. A wheelchair as claimed in claim 1 wherein the band is composed of a material selected from the group consisting of aluminum alloys, steel alloys, titanium alloys, magnesium alloys, sheet thermoplastics, and carbon fiber composites.

5. A wheelchair as claimed in claim 1 wherein a rear end of each band is fastened to the backrest, and an opposed front end of each band is fastened to a part of the wheelchair selected from the group consisting of the seat, the frame, and a cushion on the seat.

6. A wheelchair as claimed in claim 1 further comprising fasteners connecting the side guards to the wheelchair and which are adjustable in length.

7. A wheelchair as claimed in claim 1 wherein each side guard further comprises a stiffener angle having a horizontal portion connected to the seat and a vertical portion connected to the band.

8. A wheelchair as claimed in claim 7 wherein each side guard further comprises an elongated stiffener strip connected to and extending along a lower portion of the covering.

9. A side guard as claimed in claim 1 wherein the band is an elongated and curved strip mounted to the covering such that the upper portion of the side guard has a concave curvature.

10. The wheelchair according to claim 1 wherein the hinge comprises a spring hinge.

11. The wheelchair according to claim 1 wherein the side guards include attachments arranged for attaching the side guards to the wheelchair, said attachments comprising flexible material.

12. A side guard as claimed in claim 1 wherein each side guard further comprises a stiffener angle having a horizontal portion arranged to connect to the seat and a vertical portion arranged to connect to the band, the stiffener angle comprising malleable material such that an angle of the stiffener angle is arranged to be adjusted by a user to adjust a vertical angle of the side guard with respect to a planar side of the wheelchair.

* * * * *